May 31, 1949.                K. V. ANDERSON                 2,471,509
                  INLET AND EXHAUST VALVE MECHANISM
                     WITH ASSOCIATED TURBOCHARGER
Filed May 9, 1947                                    3 Sheets-Sheet 1

Inventor
Karl V. Anderson

Attorneys

May 31, 1949.   K. V. ANDERSON   2,471,509
INLET AND EXHAUST VALVE MECHANISM
WITH ASSOCIATED TURBOCHARGER
Filed May 9, 1947   3 Sheets-Sheet 2

Inventor
Karl V. Anderson

By Dodge

Attorneys

May 31, 1949.    K. V. ANDERSON    2,471,509
INLET AND EXHAUST VALVE MECHANISM
WITH ASSOCIATED TURBOCHARGER
Filed May 9, 1947    3 Sheets-Sheet 3
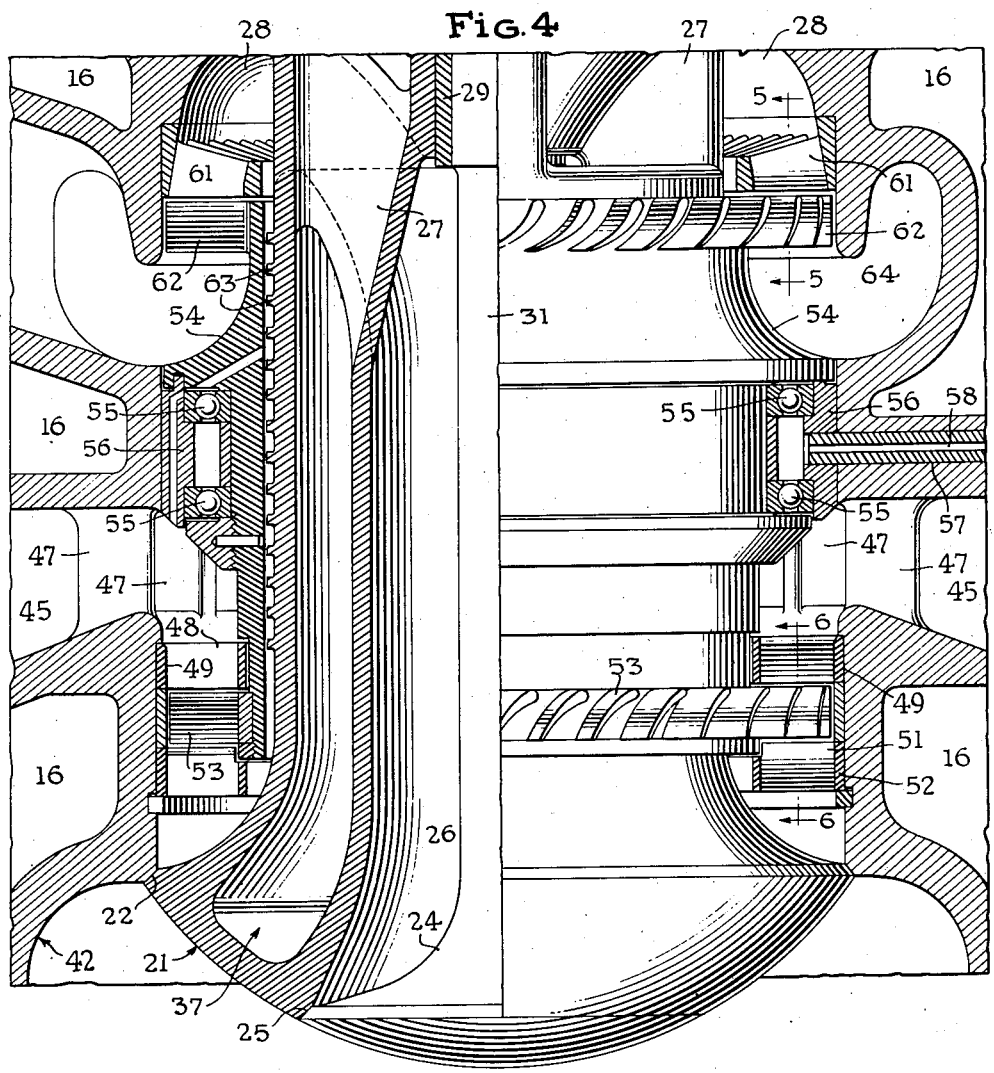
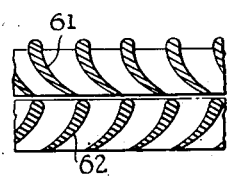
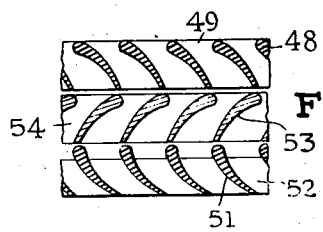
Inventor
Karl V. Anderson
Attorneys Patented May 31, 1949

2,471,509

UNITED STATES PATENT OFFICE 2,471,509

INLET AND EXHAUST VALVE MECHANISM WITH ASSOCIATED TURBOCHARGER

Karl Volmar Anderson, Milwaukee, Wis., assignor to Nordberg Manufacturing Co., Milwaukee, Wis., a corporation of Wisconsin Application May 9, 1947, Serial No. 747,060

8 Claims. (Cl. 60—13)

1

This invention relates to scavenging two-cycle engines with or without super-charging and involves the association of a combined turbine and turbo-compressing unit with a special inlet and exhaust valve mechanism, in which the valves are coaxially arranged and the inner of the two coaxial valves controls a flow path through the other valve.

Coaxial poppet valve arrangements are known and it is possible to make either of the two valves the inlet valve and the other the exhaust valve. The invention will, however, be described as used with the valve mechanism described and claimed in my copending application Serial No. 710,579, filed November 18, 1946.

In the structure of that prior application, the inlet valve is mounted in the cylinder head and is quite large. For example, it has a diameter which is ¾ to ⅘ that of the engine cylinder. The exhaust valve is much smaller and is mounted in the inlet valve so as to coact with a seat formed in the inlet valve. Thus the flow area through the inlet valve is very much larger than the flow area through the exhaust valve, with the result that inlet flow occurs at a much lower velocity than does exhaust flow.

As is the case in the prior application, the piston, cylinder head and the two valves are of such configuration that when the piston is at the head-end dead point, the combustion chamber has an approximately toric form. In the prior application, fixed guides were used to impart a whirl to the inflowing air. The use of the turbo-compressor makes it impracticable to use the guides formerly used and one feature of the invention is the use with the turbo-compressor at the discharge side thereof, of vanes which perform a similar function.

A preferred embodiment of the invention will now be described by reference to the accompanying drawings, in which:

Figure 1 is a section on the axis of a cylinder embodying the invention, the plane of section being transverse to the axis of the crankshaft. The crankshaft and connecting rod are not illustrated but conform to known practice and to the illustration in my prior application. The piston is shown at the head-end dead point;

2

Figure 4 is a view partly in section and partly in elevation, showing the valves and the turbine runner on an enlarged scale;

Figure 5 is a fragmentary section on the line 5—5 of Figure 4;

Figure 6 is a fragmentary section on the line 6—6 of Figure 4.

Although a single cylinder is shown, it will be understood that each cylinder in a multi-cylinder engine might be equipped according to the invention.

Figure 1:
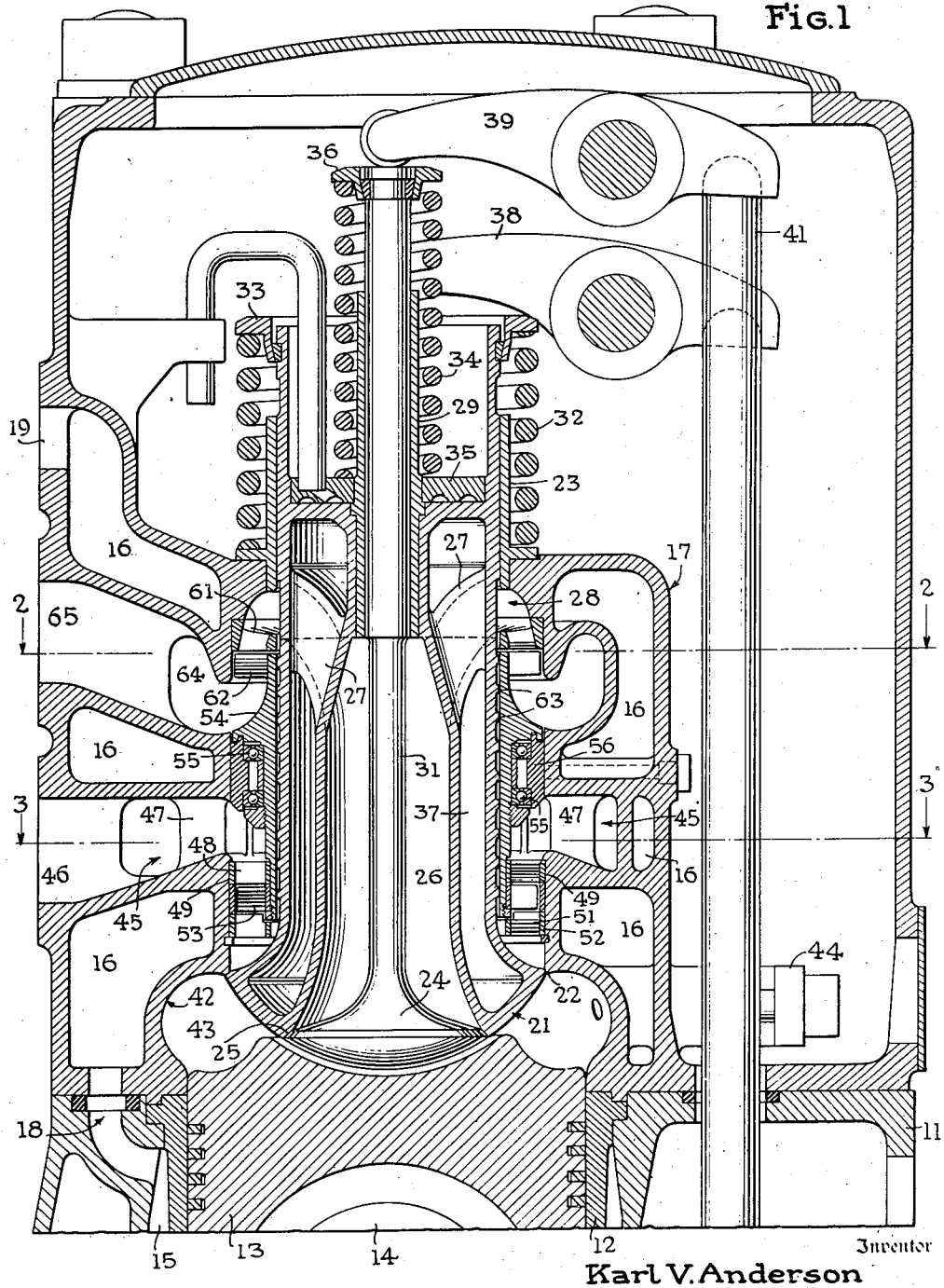
Figure 2:
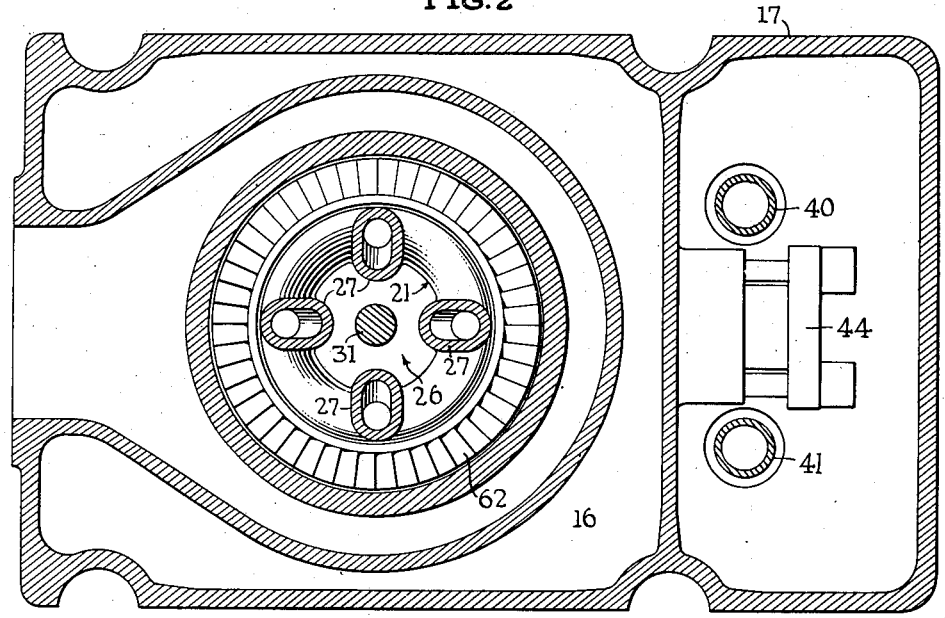
Figure 2 is a section on the line 2—2 of Figure 1 and shows the construction of the exhaust passages which lead axially through the inlet valve and then radially outward therethrough to the turbine runner.

A housing 11, a portion of which appears in Figure 1, provides seats for cylinder liners 12. The housing 11 for a multi-cylinder engine could be constructed in one piece. Working in each cylinder liner 12 is a piston 13 connected by a connecting rod, a portion of which appears at 14, with the usual crank. Outside the liners 12 are jacket spaces 15 which communicate with jacket spaces 16 in the head 17 by way of passages 18. All water spaces in the head 17 are identified by the numeral 16. These spaces are cored in the head casting and intercommunicate. Not all the water connections are shown, but one appears at 19. It is preferred to use a separate head casting for each cylinder and this construction is clearly indicated in Figures 2 and 3.

The inlet valve 21 seats at 22, on a seat formed in the head and controlling a large inlet passage formed in the head. The inlet valve 21 is partly guided by a sleeve 23 fixed in the upper portion of the head casting 17. The exhaust valve 24 closes against a seat 25 which is located at the lower extremity of an axial passage 26, extending part way through the inlet valve 21. At its upper end the passage 26 is flared outwardly and discharges around webs 27 into an annular space 28 formed in the head casting.

Immediately above radial webs 27 and fixed in the upper portion of the inlet valve 21 is a guide sleeve 29 in which the stem 31 of the exhaust valve 24 is guided. The inlet valve 21 is biased in a closing direction by coil spring 32 which seats at its lower end on a flange formed on the guide sleeve 23. At its upper end it engages a spring seat 33 removably locked to the upper end of inlet valve 21. The exhaust valve 24 is biased in a closing direction by a coil compression spring 34 which seats at its lower end on the disc 35 and its upper end on the spring seat 36 removably mounted on the stem 31 of the exhaust valve.

The disc 35 is supported by a portion of the inlet valve 21 and forms a part of the means through which cooling oil is circulated through the core or jacket space 37 in the inlet valve. That detail is not a feature of the present invention. It is fully described in the application above identified, and requires no further comment.

The inlet valve 21 is actuated by a forked rocker 38 which is actuated by a push rod 40. Exhaust valve 24 is actuated by a rocker 39 which is actuated by another push rod 41. The push rod 40 which actuates the rocker 38 is immediately behind and is obscured by the push rod 41 in Figure 1. The push rods are actuated in timed relation by cams on a camshaft, not illustrated in the drawings. The camshaft turns at crankshaft speed.

The valve timing may be varied within a considerable range and the following values are typical. The exhaust valve opens at an angle between 100° and 130° past top dead center, depending on the designed speed of the engine, and closes 10° to 25° after bottom dead center. The inlet valve or scavenging valve opens between 150° and 170° after top dead center and closes between 25° and 40° after bottom dead center.

From the above it will be observed that the exhaust valve opens before the inlet valve opens and closes while the inlet valve is open.

It will be observed that the piston 13 has an annular coved portion which surrounds a central recess. When the inlet and exhaust valves are closed they form a convex spheroidal area at the center of the cylinder head. The configurations of the parts is such that at the head-end dead point the central cavity in the top of the piston head is approximately filled. The cylinder head has an annular coved portion 42 which, with the coved portion of the piston, form an annular toric chamber 43 when the piston is at the head-end dead point. It follows that, as the piston approaches the head-end dead point, air is displaced into the toric chamber 43 in such a way as to produce active turbulence. The fuel valves, one of which appears at 44, inject fuel, which may be of any type, liquid or gaseous, into the chamber 43.

At the time the exhaust valve 24 starts to open, the piston 13 is at a point remote from the head. When the inlet valve opens, as it does after exhaust has relieved the cylinder pressure, the inlet air tends to stream down the sides of the cylinder and then inward and flow upward along the cylinder axis to the exhaust valve. To intensify the tendency of the inflowing relatively cool air to flow down the cylinder walls, the entering air is given a whirling motion by means which will be described.

Figure 3:
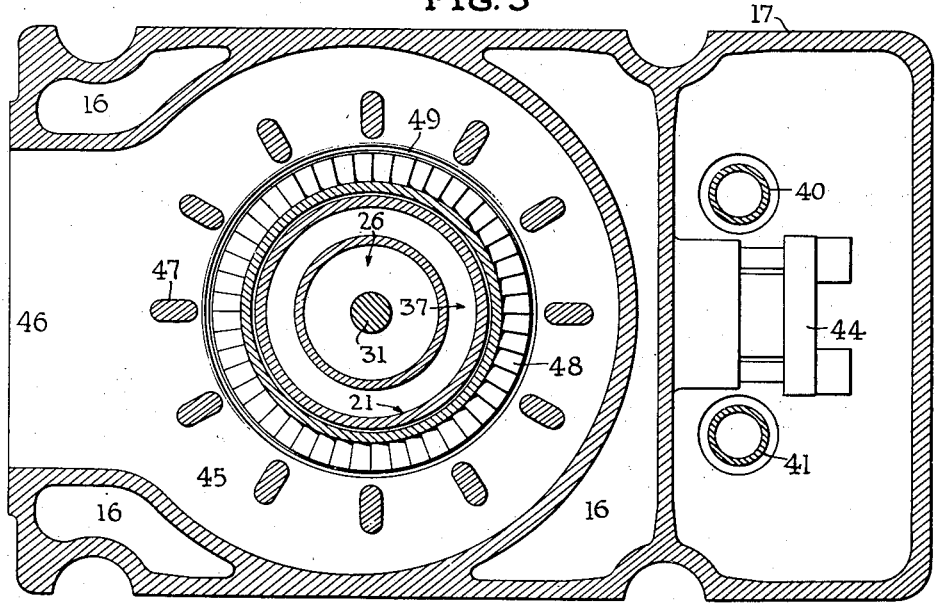
Figure 3 is a section on line 3—3 of Figure 1 and shows the construction of the turbo-compressor.

Refer to Figure 3. Formed in the cylinder head 17 is an annular chamber 45 which is fed by a scavenging air connection 46. This may lead from any suitable manifold. The manifold is not illustrated in the drawing. Spaced around the passage 46 are a series of webs 47. Scavenging air entering through the connection 46 flows between the webs 47 to a series of guide vanes 48. These are supported on a ring 49 mounted in the head casting 17. A second set of guide vanes 51 is mounted on a second ring 52 also mounted in the head casting 17. The two sets of guide vanes are spaced apart and receive between them the buckets or blades 53 of the turbo-compressor. The vanes 48 guide the air against the blades 53 and the lower guide vanes 51 direct the discharging air with a whirling motion toward the chamber 43. The blades 53 are fixed on a rotating carrier sleeve 54 which is mounted on annular ball bearings 55, supported by a sleeve 56, fixed in the cylinder casting 17. Figure 4 shows how the sleeve 56 is held by a staking pin 57. This has an oil port 58 drilled through it.

Mounted immediately below the chamber 28 is an annular guide blade structure 61 which is fixed in the head casting 17. The function of the guide blade structure 61 is to direct exhaust gases downward against the buckets 62 which are fixed on the upper end of the sleeve 54 and form the turbine component of the turbo-charger. The sleeve portion of the inlet valve 21 is formed externally with annular ribs 63. These coact with the bore of the sleeve 54 to produce a labyrinth packing. This packing resists flow between the turbo-compressor runner and the sleeve portion of the inlet valve 21.

Remembering that the exhaust valve 24 opens first, it will be seen that a rapid exhaust flow will occur through passage 26, annular chamber 28, and guides 61 against the buckets 62 of the turbine. From there the flow is by way of annular chamber 64 and exhaust passage 65 to the exhaust manifold of the engine. The exhaust manifold is not illustrated in the drawing. The effect is to drive the rotary sleeve 54 as long as the exhaust valve remains open. Since the exhaust puffs come at rapid intervals, the sleeve 54 rotates continuously but at a pulsing rate. Thus the impeller blades 53 of the turbo-compressor are constantly active and become effective to deliver air to the cylinder as soon as the inlet valve 21 opens.

The described construction affords a turbo-charging unit for each engine cylinder. The nested arrangement of the inlet and exhaust valves permits the turbo-charging runner to be so closely associated with the valves that the path for exhaust gases and the path for inlet air are each very little longer than they are in construction of the prior application.

The advantage of using a distinct turbo-charging unit for each cylinder arises from the fact that each unit is effective to prevent back flow from the exhaust manifold. As a consequence, it is unnecessary to subdivide the exhaust manifold as is customarily done where a single turbo-charging unit serves all the cylinders of an engine. Since the exhaust valve opens before the inlet valve starts to open and remains open for a considerable portion of the period during which the inlet valve is open, the individual turbo-charger is quite effective in its function of deriving energy from the exhaust flow and applying it to stimulation of inlet flow. This effect is further enhanced by the fact that the use of a central exhaust valve of small size in conjunction with a relatively large inlet valve establishes conditions under which exhaust flow, which actuates the turbo element, occurs at high velocity, whereas the inlet flow which scavenges the cylinder and super-charges it, occurs at much lower velocity.

For these reasons, the particular arrangement illustrated is preferred, but the invention can be applied to nested valves regardless of which of the two valves is the exhaust valve and which the inlet valve, provided neither valve controls flow through the other, and the valves are so arranged as to resist short circuiting flow from the inlet to the exhaust passage. The conventional push rod valve-actuating mechanism has been illustrated because that is the one most commonly used, but so far as this invention is concerned, it is immaterial how the inlet and exhaust valves are actuated, provided they are actuated in properly timed relation. The main function of the second or lower set of guide vanes in the turbo-compressor unit is to impart an annular whirling motion to the discharging air. Where this action is not desired, the lower set of guide vanes may be omitted.

Another reason for preferring the illustrated arrangement is the fact that the runner, and particularly the runner bearings, are protected against excessive heating by the exhaust gases. The jacket space 37 in the inlet valve is oil cooled, as stated above, and by means more elaborately described in my copending application. So far as the present invention is concerned, the significant fact is that the jacket space 37 surrounds the exhaust passage so that hot exhaust gases flowing to the turbine element of the turbo-charger do not deliver heat to the sleeve of the turbo-charger and its sustaining bearing. It is not until the exhaust gases have been cooled to a considerable extent by expansion through the turbine blades and conversion of their heat into work that the gases closely approach the turbo-charger bearing. Furthermore, cool scavenging air approaching the turbo-compressor and before compression, flows quite close to the turbo-charger bearing. It follows that the bearing is not only cooled by air but is protected as far as is reasonably practicable from accessions of heat from the exhaust gases.

What is claimed is:

1. In an internal combustion engine the combination of a cylinder and piston enclosing a working space; coaxial inlet and exhaust poppet valves controlling admission to and exhaust from said space; a rotary runner encircling said valves and having turbine blades in the path of exhaust flow and turbo-compressor blades in the path of inlet flow whereby the runner is adapted to apply the energy of exhaust to stimulate inlet flow; and means for operating said valves.

2. In an internal combustion engine the combination of a cylinder and piston enclosing a working space; the head of said cylinder having an inlet passage leading to a valve seat; an inlet valve of the poppet type guided in the head and coacting with said seat, said valve having an axial exhaust passage leading from a valve seat formed in the valve; an exhaust valve guided in the inlet valve and coacting with the last-named seat; a sleeve-like runner rotatably mounted in the head, encircling a portion of the inlet valve and having turbine blades in the path of flow through said exhaust passage and turbo-compressor blades in the path of flow through said inlet passage; and means for operating said valves.

3. In an internal combustion engine, the combination of a cylinder structure and piston enclosing a working space; means forming an inlet passage leading to said space and having an inlet valve seat; an inlet valve of the poppet type coacting with said seat to control said passage, said valve having an exhaust passage leading axially through the valve and an exhaust valve seat formed therein, and a jacket space for the circulation of cooling medium surrounding said axial passage; an exhaust valve of the poppet type guided in the inlet valve and coacting with the last-named valve seat; means for actuating said valves; a runner encircling a portion of said inlet valve and provided with turbine blades in the path of flow through said exhaust passage and turbo-compressor blades in the path of flow through said inlet passage; and bearing means surrounding said runner, sustained by a portion of the cylinder structure, and serving to sustain said runner.

4. The combination defined in claim 3 in which the runner is in the form of an elongated sleeve, with the turbine blades and turbo-compressor blades located respectively near the opposite ends thereof, and the bearing means are located approximately at mid-length of the sleeve.

5. The combination defined in claim 3 in which the runner is in the form of an elongated sleeve, with the turbine blades and turbo-compressor blades located respectively near the opposite ends thereof, the bearing means are located approximately at mid-length of the sleeve, and the inlet and exhaust passages are so formed that inlet flow passes close to the bearing as it approaches the turbo-compressor blades, and exhaust flow approaches the bearing only after expansion through the turbine blades has occurred.

6. In an internal combustion engine, the combination of a cylinder structure and piston enclosing a working space; means forming an inlet passage leading to said space and having an inlet valve seat; an inlet valve of the poppet type coacting with said seat to control said passage, said valve having an exhaust passage leading axially through the valve and an exhaust valve seat formed therein, and a jacket space for the circulation of cooling medium surrounding said axial passage; an exhaust valve of the poppet type guided in the inlet valve and coacting with the last-named valve seat; means for actuating said valves; a runner encircling a portion of said inlet valve and provided with turbine blades in the path of flow through said exhaust passage and turbo-compressor blades in the path of flow through said inlet passage; bearing means surrounding said runner, sustained by a portion of the cylinder structure, and serving to sustain said runner; and labyrinth packing means between said runner and said inlet valve adapted to maintain a running seal while the runner rotates and the valve reciprocates.

7. The combination defined in claim 6 in which the inlet valve has an elongated cylindrical neck and the runner is in the form of a surrounding elongated cylindrical sleeve, with the turbine blades and turbo-compressor blades located respectively near the opposite ends thereof, and the bearing means are located approximately at mid-length of the sleeve.

8. In an internal combustion engine the combination of a cylinder and piston enclosing a working space; coaxial inlet and exhaust valves of the poppet type controlling admission to and exhaust from said space; a rotary runner encircling said valves and having turbine blades in the path of exhaust flow and turbo-compressor blades in the path of inlet flow; fixed guide vanes for directing exhaust flow against said turbine blades and fixed guide vanes on the exit and entrance sides of said turbo-compressor blades, the vanes on the exit side being arranged to impart a whirling motion to air entering said working space through said inlet valve.

KARL VOLMAR ANDERSON.

REFERENCES CITED

The following references are of record in the file of this patent:

UNITED STATES PATENTS

| Number | Name | Date |
| --- | --- | --- |
| 1,191,150 | Brown | July 18, 1916 |
| 2,198,679 | Radelet et al. | Apr. 30, 1940 |